United States Patent
Skrypchuk et al.

(10) Patent No.: US 12,172,646 B2
(45) Date of Patent: Dec. 24, 2024

(54) CONTROL SYSTEM FOR A VEHICLE

(71) Applicant: JAGUAR LAND ROVER LIMITED, Coventry (GB)

(72) Inventors: Lee Skrypchuk, Meriden (GB); Simon Thompson, Coventry (GB); Jed Clark, Coventry (GB); Kirsten Revell, Coventry (GB); Neville Stanton, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 275 days.

(21) Appl. No.: 17/777,602

(22) PCT Filed: Nov. 17, 2020

(86) PCT No.: PCT/EP2020/082414
§ 371 (c)(1),
(2) Date: May 17, 2022

(87) PCT Pub. No.: WO2021/099321
PCT Pub. Date: May 27, 2021

(65) Prior Publication Data
US 2023/0016222 A1     Jan. 19, 2023

(30) Foreign Application Priority Data
Nov. 18, 2019     (GB) ..................... 1916755

(51) Int. Cl.
*B60W 30/182* (2020.01)
*B60W 50/08* (2020.01)
(Continued)

(52) U.S. Cl.
CPC ........ *B60W 30/182* (2013.01); *B60W 50/082* (2013.01); *B60W 50/14* (2013.01);
(Continued)

(58) Field of Classification Search
CPC .. B60W 30/182; B60W 50/082; B60W 50/14; B60W 60/0053; B60W 60/005;
(Continued)

(56) References Cited

U.S. PATENT DOCUMENTS

| 10,493,997 B2 * | 12/2019 | Kim | ................... B60W 50/082 |
| 2014/0049452 A1 * | 2/2014 | Maltz | ................... G02B 27/017 |
| | | | 345/8 |

(Continued)

FOREIGN PATENT DOCUMENTS

| GB | 2572203 A | | 9/2019 |
| KR | 20170087335 A | * | 7/2017 |
| WO | 2017021602 A1 | | 2/2017 |

OTHER PUBLICATIONS

Combined Search and Examination report corresponding to Great Britain Application No. GB1916755.0, May 19, 2020, 4 pages.

(Continued)

*Primary Examiner* — Michael J Zanelli
(74) *Attorney, Agent, or Firm* — Reising Ethington P.C.

(57) ABSTRACT

Aspects of the present invention relate to control system (100) for controlling a transition of a vehicle between a first driving mode and a second driving mode. The control system comprises one or more controllers, configured to: receive (302) a first request signal indicative of an occupant-initiated preparatory request; receive (303) a second request signal indicative of an occupant-initiated transition request; determine (304) a first control signal for controlling output of information to an occupant of the vehicle indicative of the driving environment in dependence on receipt of the first request signal; determine (308) a second control signal for causing transition of the vehicle from the first driving mode to the second driving mode in dependence on receipt of both the first request signal and the second request signal; and (Continued)

output (306, 310) the first or second control signal to a vehicle system.

15 Claims, 5 Drawing Sheets

(51) Int. Cl.
*B60W 50/14* (2020.01)
*B60W 60/00* (2020.01)

(52) U.S. Cl.
CPC ... *B60W 60/0053* (2020.02); *B60W 2050/143* (2013.01); *B60W 2050/146* (2013.01); *B60W 2540/21* (2020.02); *B60W 2540/223* (2020.02); *B60W 2540/225* (2020.02)

(58) Field of Classification Search
CPC ..... B60W 2050/143; B60W 2050/146; B60W 2040/21; B60W 2040/223; B60W 2040/225; G05D 1/0061
See application file for complete search history.

(56) References Cited

U.S. PATENT DOCUMENTS

| | | | |
|---|---|---|---|
| 2014/0303827 A1* | 10/2014 | Dolgov | B60W 60/0053 701/23 |
| 2016/0362116 A1* | 12/2016 | Otsuka | B60W 60/0051 |
| 2017/0234689 A1 | 8/2017 | Gibson et al. | |
| 2018/0017968 A1 | 1/2018 | Zhu et al. | |
| 2019/0232976 A1 | 8/2019 | Uetani et al. | |
| 2019/0265698 A1 | 8/2019 | Tod et al. | |
| 2019/0339697 A1 | 11/2019 | Kapuria et al. | |
| 2020/0307691 A1* | 10/2020 | Kalabic | B62D 15/0255 |

OTHER PUBLICATIONS

International Search Report corresponding to International Application No. PCT/EP2020/082414, dated Feb. 23, 2021, 5 pages.
Written Opinion corresponding to International Application No. PCT/EP2020/082414, dated Feb. 23, 2021, 7 pages.
European Office Action corresponding to application 20812233.3, dated Apr. 22, 2024, 7 pages.

* cited by examiner

CONTROL SYSTEM FOR A VEHICLE

TECHNICAL FIELD

The present disclosure relates to a control system for a vehicle, particularly but not exclusively to a control system for controlling a transition of a vehicle between a first driving mode and a second driving mode. Aspects of the invention relate to a control system, to a system comprising the control system, to a vehicle, to a control method, to computer software and to computer-readable storage medium.

BACKGROUND

It is known to operate a vehicle in accordance with an autonomous driving mode. A number of levels of vehicle automation have been defined, with a fully autonomous vehicle being understood to require no input from a user or occupant. Levels of lesser automation include Conditionally Automated Vehicle (CAV) and Highly Automated Vehicles (HAV). CAVs and HAVs represent partially autonomous vehicles where the vehicle expects or asks, respectively, to transfer control to the driver when approaching a geographical, terrain, capability or design boundary.

This transfer of control or transition between driving modes may be problematic, as the user may have been mentally disengaged from the driving environment, including the vehicle status, vehicle controls, traffic status, terrain status and the like, for some time.

It is an aim of the present invention to address one or more of the disadvantages associated with the prior art.

SUMMARY OF THE INVENTION

Aspects and embodiments of the invention provide a control system, a system comprising the control system, a vehicle, a control method, computer software and a computer-readable storage medium as claimed in the appended claims.

According to an aspect of the present invention there is provided a control system for controlling a transition of a vehicle between a first driving mode and a second driving mode, the control system comprising one or more controllers, configured to: receive a first request signal indicative of occupant-initiated preparatory request; receive a second request signal indicative of occupant-initiated transition request; determine a first control signal for controlling output of information to an occupant of the vehicle indicative of the driving environment in dependence on receipt of the first request signal; determine a second control signal for causing transition of the vehicle from the first driving mode to the second driving mode in dependence on receipt of both the first request signal and the second request signal; and output the first or second control signal to a vehicle system.

In this way, the occupant can request information about the driving environment before transfer of control takes places, thereby improving the occupant's situational awareness during a transfer procedure. This reduces the likelihood of the occupant being confused on taking control and reduces the mental workload when resuming control of the vehicle. The occupant prepares for transfer of control by making the occupant-initiated preparatory request, and then indicates that they are ready for the transfer of control with the occupant-initiated transition request. The occupant can also choose to generate the first request signal at any point while the vehicle is in an autonomous driving mode. In this way, the occupant may obtain the information about the driving environment, without proceeding to transfer control.

Optionally, the one or more controllers collectively comprise: at least one electronic processor having one or more electrical inputs for receiving the first and/or second request signal; and at least one electronic memory device operatively coupled to the at least one electronic processor and having instructions stored therein; wherein the at least one electronic processor is configured to access the at least one memory device and execute the instructions stored therein so as to determine the first and/or second control signal.

In an embodiment, the first driving mode is a manual driving mode. The second driving mode may be an autonomous driving mode. Optionally, the first driving mode or the second driving mode is a partially autonomous driving mode. In this way, the control system may be used to manage transition between various levels of automation in the driving modes.

In an embodiment, the control system is configured to receive the first request signal from a first sensor, the first request signal being indicative of at least one first occupant-input detected by the first sensor. The first request signal may be indicative of a plurality of occupant-inputs being detected by the first sensor. In this way, the occupant may take an action, or a set of actions, detectable by one or more sensors, for example, a simple hand gesture, a two-handed gesture, a voice command, a touch signal, and so on.

The first request signal may be indicative of a detected occupant-input comprising an occupant gaze of a predefined characteristic. The gaze may have a predefined characteristic such as a predefined direction and/or duration. For example, the occupant may be detected looking at a certain vehicle control for a certain period of time. The occupant may direct their gaze directly ahead of the vehicle, at a defined point within the vehicle, at a Head Up Display (HUD) or Head Down Display, or in other suitable directions, as will be appreciated. For example, a gaze directed to the rear-view mirror, a gaze to an automated driving mode icon or display. These are convenient ways for the user to interact with the vehicle controls.

The first request signal may be indicative of a detected occupant-input comprising the occupant placing one hand on a steering wheel of the vehicle. This is a convenient and intuitive way for the occupant to deliberately indicate that they wish to indicate a request for information relating to the driving environment and/or operational state of the vehicle.

The second request signal may be indicative of a detected occupant-input comprising the occupant placing both hands on a steering wheel of the vehicle. This is a convenient and intuitive way for the occupant to deliberately indicate that he or she is ready for control of the vehicle to transfer to them.

In an embodiment, the information indicative of the driving environment comprises at least one of: potential hazards, time until handover, speed, upcoming manoeuvres, and future action required. In this way, information that drivers naturally engage with during transfer of control of the vehicle is provided to them when they are seeking situational awareness. Potential hazards may include for example, nearby vehicles, weather information, road condition and the like. In addition to speed, other vehicle status information such as current position on roadway, fuel status, an indication of how well the automation has been operating so far, an indication of the how well the automation is currently operating, time to destination may be provided. Upcoming manoeuvres may include route planning information, such as a required handover at a certain location.

According to another aspect of the invention, there is provided a system comprising a control system as defined above comprising a sensor for detecting one or both of the first request signal and second request signal.

Optionally, the sensor is attached to or integral with the steering wheel of the vehicle. This is a convenient location for the user to interact with a sensor in the vehicle. The sensor may be a touch sensor, which would allow the user to generate one or more of the request signals in an intuitive manner by placing one or two hands on the steering wheel.

In an embodiment, the sensor comprises an imaging system for detecting the pose of the occupant's hands. The sensor may comprise a gaze sensor for monitoring the gaze of the occupant. The gaze sensor may comprise an image sensor. Optionally, the sensor comprises an audio sensor for receiving voice signals from the occupant. Such sensor arrangements may be conveniently implemented in the vehicle and are simple and efficient for the driver.

According to another aspect of the invention, there is provided a vehicle comprising the control system described herein. Such a vehicle would allow a user to transition between manual control and different levels of autonomous control thereof in a considered manner by encouraging the user to resume situational awareness before driving mode transition.

According to yet another aspect of the invention, there is provided a control method for controlling a transition of a vehicle between a first driving mode and a second driving mode, the control method comprising receiving a first request signal indicative of occupant-initiated preparatory request; receiving a second request signal indicative of occupant-initiated transfer request; determining a first control signal for controlling output of information to an occupant of the vehicle indicative of the driving environment in dependence on receipt of the first request signal; determining a second control signal for causing transition of the vehicle from the first driving mode to the second driving mode in dependence on receipt of both the first request signal and the second request signal; and outputting the first or second control signal to a vehicle system.

In an embodiment, the first driving mode is a manual driving mode. The second driving mode may be an autonomous driving mode. Optionally, the first driving mode or the second driving mode is a partially autonomous driving mode. In this way, the control system may be used to manage transition between various levels of automation in the driving modes.

Optionally, receiving a first request signal comprises receiving the first request signal on detection of the occupant placing one hand on a steering wheel of the vehicle. Receiving a second request signal may comprise receiving the second request signal on detection of the occupant placing both hands on a steering wheel of the vehicle. In this way, the method provides for staged transfer of control to the user, in a convenient and intuitive manner. Receiving the second request signal may occur after receiving the first request signal, if the occupant first places one hand on the steering wheel, the subsequently places a second hand on the steering wheel. Alternatively, receiving the second request signal may occur without receiving the first request signal, if the occupant places both hands on the steering wheel at the substantially the same time.

According to a further aspect of the invention, there is provided computer software which, when executed, is arranged to perform a method as defined above. The computer software may be stored on a computer-readable medium.

According to a still further aspect of the invention, there is provided a non-transitory, computer-readable storage medium storing instructions thereon that when executed by one or more processors causes the one or more processors to carry out a method as defined above.

According to an additional aspect of the invention, there is provided a control system for use in a transition of a vehicle between a first driving mode and a second driving mode, the control system comprising one or more controllers, configured to: receive a first request signal indicative of occupant-initiated preparatory request; determine a first control signal for controlling output of information to an occupant of the vehicle indicative of the driving environment in dependence on receipt of the first request signal; and output the first control signal to a vehicle system.

According to a yet further aspect of the invention, there is provided a control system for controlling a transition of a vehicle between a first driving mode and a second driving mode, the control system comprising one or more controllers, configured to: receive a first request signal indicative of a first occupant request; receive a second request signal indicative of a second occupant request; determine a first control signal for controlling output of information to an occupant of the vehicle on receipt of the first request signal; determine a second control signal for causing transition of the vehicle from the first driving mode to the second driving mode in dependence on receipt of the second request signal; and output the second control signal to a vehicle system.

Any controller, controllers, control means or control system described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
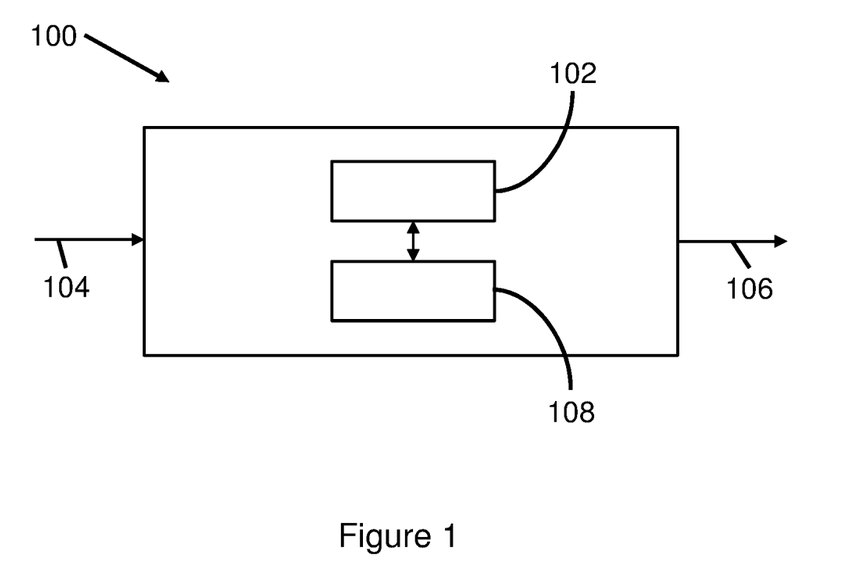
FIG. 1 shows a schematic representation of a control system in accordance with an embodiment of the present invention.

A control system in accordance with an embodiment of the present invention, and indicated generally by the reference numeral 100, is described herein with reference to the accompanying FIG. 1. The control system 100 may also be referred to as a controller or control unit.

The control system 100 comprises a control means 102, input means 104 and output means 106. The control system 100 additionally comprises a memory means in the form of a memory device 108 for storing data therein. The input means 104 is configured to receive a signal in the form of one or more request signals. The one or more request signals are indicative of an occupant-initiated request from an occupant of a vehicle adapted to operate in an autonomous driving mode and a manual driving mode. A vehicle adapted to operate in an autonomous driving mode and a manual driving mode may be referred to herein as an autonomous vehicle. The output means 106 is configured to transmit a signal in the form of one or more control signals. The control signal(s) may be output to one or more vehicle control units of a vehicle so as to control operation of one or more vehicle systems—e.g. for controlling the vehicle in an autonomous driving mode. The control means 102 is configured to determine the one or more control signals in dependence on the one or more request signals.

The one or more request signals comprise a first request signal indicative of an occupant-initiated preparatory request. In the illustrated embodiment, the one or more request signals additionally comprise a second request signal indicative of an occupant-initiated transition request.

The control means 102 may be formed by one or more electronic processing devices such as an electronic processor. The electronic processor may have one or more electrical inputs for receiving the first request signal and/or the second request signal. The processor is configured to determine the one or more control signals. The one or more control signals are determined in dependence on receipt of the one or more request signals. The one or more control signals may include a first control signal and a second control signal. The control means 102 is configured to determine a first control signal suitable for controlling output of information to an occupant of the vehicle indicative of the driving environment in dependence on receipt of the first request signal. The control means 102 is configured to determine a second control signal, in dependence on receipt of both the first request signal and the second request signal, for causing transition of the vehicle from the first driving mode to the second driving mode. The control means is operably coupled to the one or more electronic memory devices 108, and is configured to operably execute computer readable instructions stored therein. The control means 102 is arranged to control the output means 106 to output the one or more control signals in dependence on the one or more request signals. The control means 102 is arranged to control the output means 106 to output the one or more control signals in dependence on the one or more request signals.

The output means 106 comprises an electrical output for outputting the one or more control signals. The first control signal is suitable for controlling the output of information to the occupant of the vehicle indicative of the driving environment in dependence on receipt of the first request signal. The second control signal is suitable for causing transition of the vehicle from the first driving mode to the second driving mode in dependence on receipt of both the first request signal and the second request signal. Typically, the first driving mode may be an autonomous driving mode, for example a conditionally automated driving mode of a Conditionally Automated Vehicle (CAV) or a highly automated driving mode of a Highly Automated Vehicle (HAV). Conditionally automated driving modes and highly automated driving modes may be referred to as partially autonomous driving modes. Typically, the second driving mode may be a manual driving mode. Alternatively, the second driving mode may be an autonomous driving mode having a higher or lower level of autonomy, for example transitioning between a conditionally automated driving mode and a highly automated driving mode.

The input means 104 and the output means 106 may be combined, such as by being formed by an I/O unit or interface unit. For example, the control system 100 may comprise an interface to a network forming a communication bus of the host vehicle. The interface bus may be an Internet Protocol (IP) based communication bus such as Ethernet, although embodiments of the invention are not limited in this respect.

The user may choose to obtain information on the driving environment prior to a transition between a first driving mode and a second driving mode, by initiating a preparatory signal. In this way, the user may regain situational awareness that may have been lost while the vehicle was operating in an autonomous driving mode. An autonomous driving system within the vehicle is arranged to either provide information to the occupant or transition the vehicle between a first driving mode and a second driving mode in dependence on the output of the first control signal or the second control signal, respectively. It will be understood that the first request signal does not initiate the transfer of control, merely triggers the provision of information to the occupant. The occupant can choose to generate the first request signal at any point while the vehicle is in an autonomous driving mode, even if a transfer of control is not contemplated. For example, the occupant may simply want a status update on progress through the journey; to check that the vehicle is dealing with a situation they have observed; or other status information.

Throughout the specification, the terms occupant, user and driver may be used interchangeably to refer to the person who would be the driver if the vehicle was operating in a driving mode requiring manual input.

Throughout the specification, the term driving environment may be understood to refer to the operating environment of the vehicle, including the status of the vehicle itself and the vehicle's surroundings. The status of the vehicle may include speed, gear, fuel status, route, upcoming manoeuvres, vehicle controls, and so on. The vehicle's surroundings include traffic, terrain, weather, road layout, and so on.

Figure 2:
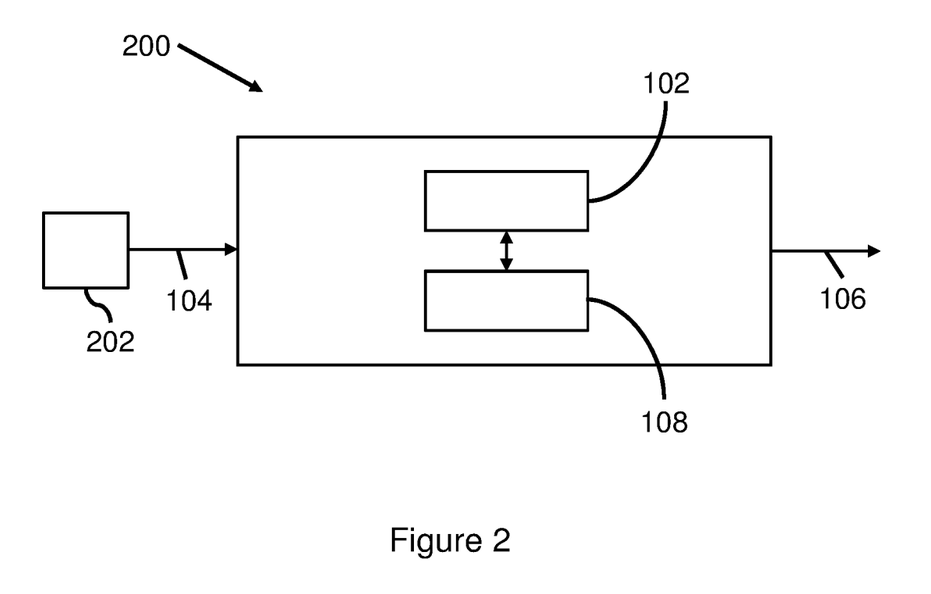
FIG. 2 shows a schematic representation of a system incorporating a control system in accordance with an embodiment of the present invention.

Referring now to FIG. 2 there is shown a system, indicated generally by the reference numeral 200, comprising the control system 100 as described previously in relation to FIG. 1. In addition to the control system 100, the system 200 comprises a sensing means suitable for detecting one or more occupant-initiated requests. The sensing means may comprise one or more sensors 202. The sensors 202 may generate the first request signal on detection of at least one first occupant-input. The sensors 202 may be adapted to detect an occupant-initiated preparatory request and an occupant-initiated transition request. A single sensor 202 may be adapted to detect both the occupant-initiated preparatory request and the occupant-initiated transition request. Alternatively, each occupant-initiated request may require a dedicated sensor 202. The sensors 202 may be configured to output data to the control system 100. Additionally or alternatively, the sensors 202 may be configured to process their data before transmission to the control system 100.

Each occupant-initiated request may take the form of one or more actions by the occupant. Therefore the generation of a single occupant-initiated request may require inputs from more than one sensor 202.

The sensor 202 may be a single sensor or may be a collection of sensors. In a collection of sensors, the sensors may be the same type of sensor, or may comprise sensors which differ from another sensor in the collection.

The sensor 202 may include one or more sensors adapted to monitor the gaze of the occupant. The sensors may be adapted to detect a predefined characteristic of the gaze. Such a sensor may be an image sensor directed at the occupant's face. A suitable sensor may be adapted to detect a gaze of a certain direction and/or of a certain duration. In this way, the occupant may generate an occupant-initiated request by looking at a certain point or object within the vehicle in such a way to meet predetermined features. For example, the occupant may be required to look at a vehicle display for a certain period of time.

The sensor 202 may include one or more sensors adapted to detect a voice input from the occupant. In this way, the occupant may be required to say a predefined word or phrase so as to generate an occupant-initiated request and so generate a request signal in the control system 100.

The sensor 202 may include one or more sensors forming an imaging system. The imaging system may be configured to detect the pose of the occupant's hands. In this way, the user may make certain shapes or signs with one or both of their hands to generate an occupant-initiated request. The imaging system may detect the position of the occupant's hands, and recognise an occupant-initiated request if the hands are placed in certain locations in the vehicle. For example, the imaging system may detect if the user has placed one or both hands on the steering wheel. The imaging system may be used to detect if the user has made a certain gesture, wherein a gesture includes a movement of the hand. Additionally or alternatively, the imaging system may be configured to detect characteristics of the occupant's gaze.

The sensor 202 may be a tactile sensor or touch sensor adapted to detect the presence of the user's hands in certain locations. For example, one or more tactile sensors may be attached to or integral with in the steering wheel and may detect the occupant's hand or hands in contact with the steering wheel. A tactile sensor may be implemented in a variety of ways, for example pressure sensor(s), capacitive switch(es), resistance touch switch(es), piezo touch switch(es) and one or more arrays formed from these switches. Similarly, sensors or arrays of sensors may be included in the pedals, gear shifter, hand brake or other controls of the vehicle to detect user interaction therewith.

Figure 3:
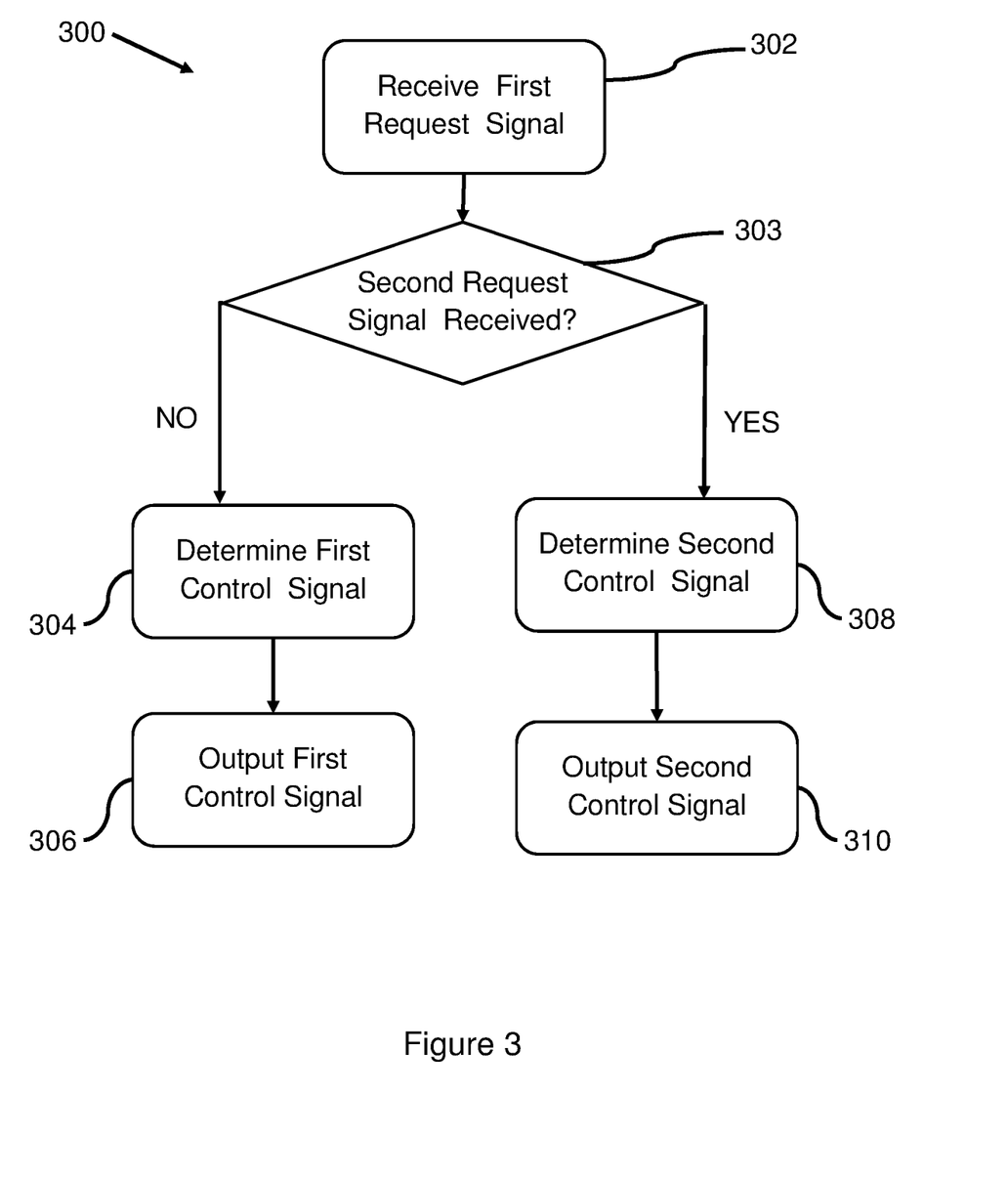
FIG. 3 shows a flow chart of a control method in accordance with an embodiment of the present invention.

Referring now to FIG. 3, there is shown a flow chart of a control method, indicated generally by the reference numeral 300, for controlling a transition of a vehicle between a first driving mode and a second driving mode. The method 300 comprises receiving 302 a first request signal indicative of occupant-initiated preparatory request. Next, the method checks 304 if a second request signal indicative of occupant-initiated transfer request has been received. If a second request signal has not been received, the method determines 304 a first control signal for controlling output of information to an occupant of the vehicle indicative of the driving environment. Then, the method 300 outputs 306 the first control signal. If the second request signal has been received, the method determines 308 a second control signal for causing transition of the vehicle from the first driving mode to the second driving mode. The method outputs 310 the second control signal. The control signals may be output to an autonomous vehicle control system, which may act to take the actions associated with the control signals.

The first request signal and second request signal may be received substantially simultaneously if the user places both hands on the wheel substantially at the same time. Alternatively, if the user places one hand on the steering wheel first, later followed by the second hand, the first request signal and the second request signal will be spaced apart in time.

Figure 4:
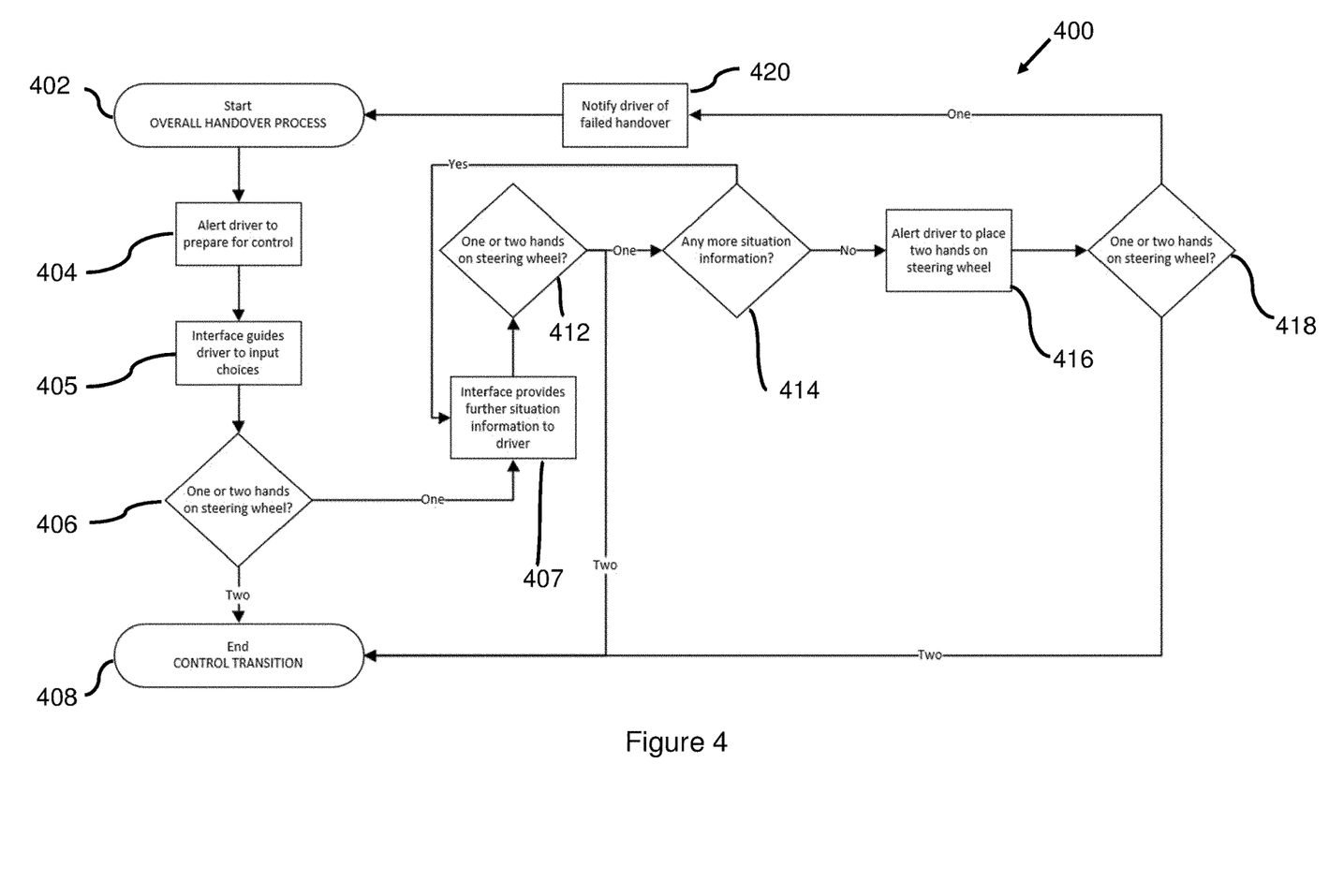
FIG. 4 shows a flow chart of a control method in accordance with an embodiment of the present invention.

Referring now to FIG. 4, there is shown a flow chart of a control method, indicated generally by the reference numeral 400, for controlling a transition of a vehicle between a first driving mode and a second driving mode. At 402, the process for the transfer of control is commenced. At 404, the driver is alerted to prepare for transfer of control of the vehicle. The timing and manner of this alert may be customised by the driver. The alert may be in a staged manner, for example, a first alert with 10 minutes to go, and a second alert with 5 minutes to go to the transfer of control. At 405, the interface of the vehicle guides the user to input their choices. The user may be guided as to the control options available to them in preparing to transition the driving mode of the vehicle, and how to cause the transition to occur. As such, the user may be guided as to the occupant-initiated requests that they can make in preparing to transition the driving mode of the vehicle, and how to cause the transition to occur. For example, in one embodiment, the user may be instructed to place one hand on the steering wheel to create an occupant-initiated preparatory request that results in receiving information on the driving environment. Further, the user may be instructed to place two hands on the steering wheel to create an occupant-initiated transition request that triggers the transition such that the user takes control of the vehicle. At 406, a check is performed to see how many hands the user has placed on the steering wheel. If two hands have been placed on the steering wheel, creating the occupant-initiated preparatory request and the occupant-initiated transition request, the first request signal and second request signal are generated and received by the control system. The second control signal is generated and output so as to cause the driving mode transition to occur at 408 and the method terminates.

If the check at 406 detects that one hand has been placed on the steering wheel, creating only the occupant-initiated preparatory request, the control system will receive the resulting first request signal. The first control signal is determined and output so that the information on the driving environment is provided to the occupant at 407. This information may include potential hazards, time until handover, distance until handover, speed, upcoming manoeuvres, and future action required. In this way, information that drivers naturally engage with during transfer of control of the vehicle is provided to them when they are seeking situational awareness. Potential hazards may include for example, nearby vehicles, weather information, road condition and the like. In addition to speed, other vehicle status information such as current position on roadway, fuel status, an indication of how well the automation has been operating so far, an indication of the how well the automation is currently operating, time to destination may be provided. Upcoming manoeuvres may include route planning information, such as a required handover at a certain location. Other information that may be provided includes traffic information, distance left until takeover, time left until takeover, vehicle speed, route information, journey information, traffic information, hazard information, information on upcoming manoeuvres, weather and road condition information, time to destination, fuel level information, vehicle range information, an indication of how the driver can change the current route; and reasons for an upcoming handover such as roadworks other relevant information may be provided as will be apparent to the person skilled in the art.

At 412, another check is performed as to the number of hands on the wheel. If there is still only one hand on the wheel, such that the control system is still only receiving the first request signal, a check is performed at 414 to determine whether there is further situation information to provide to the occupant. If so, the method 400 reverts to 407 wherein the additional information is provided to the user. The available information may be ranked by importance, with critical information relayed initially and further information only relayed if the occupant is still requesting information by holding only one hand on the steering wheel. These steps 410, 412 and 414 of checking for a single hand on the wheel and providing information may continue as long as there is information to impart and the transition of control is not required.

If the occupant continues to keep only one hand on the steering wheel and it is necessary for the transition of control to take place, the user may be instructed at 416 to place both hands on the steering wheel, thus resulting in the first input request and second input request being received by the control system and thus the second control signal being output. Next another check for the number of hands on the wheel occurs at 418. If the occupant still only keeps one hand on the steering wheel, the transfer of control does not occur. The occupant is notified at 420 that the transfer of control failed.

If at any of the checks for the number of hands on the steering wheel at 412 or 418, two hands are detected on the steering wheel, the method proceeds to 408 and the transfer of control is executed as above.

The alerts and other messages for the occupant of the vehicle may be relayed to the occupant with audio messages through speaker and visually using a Heads-Up Display (HUD) or Heads Down Display (HDD). The manner in which the alerts and messages are relayed to the occupant may be customisable by the occupant.

Figure 5:
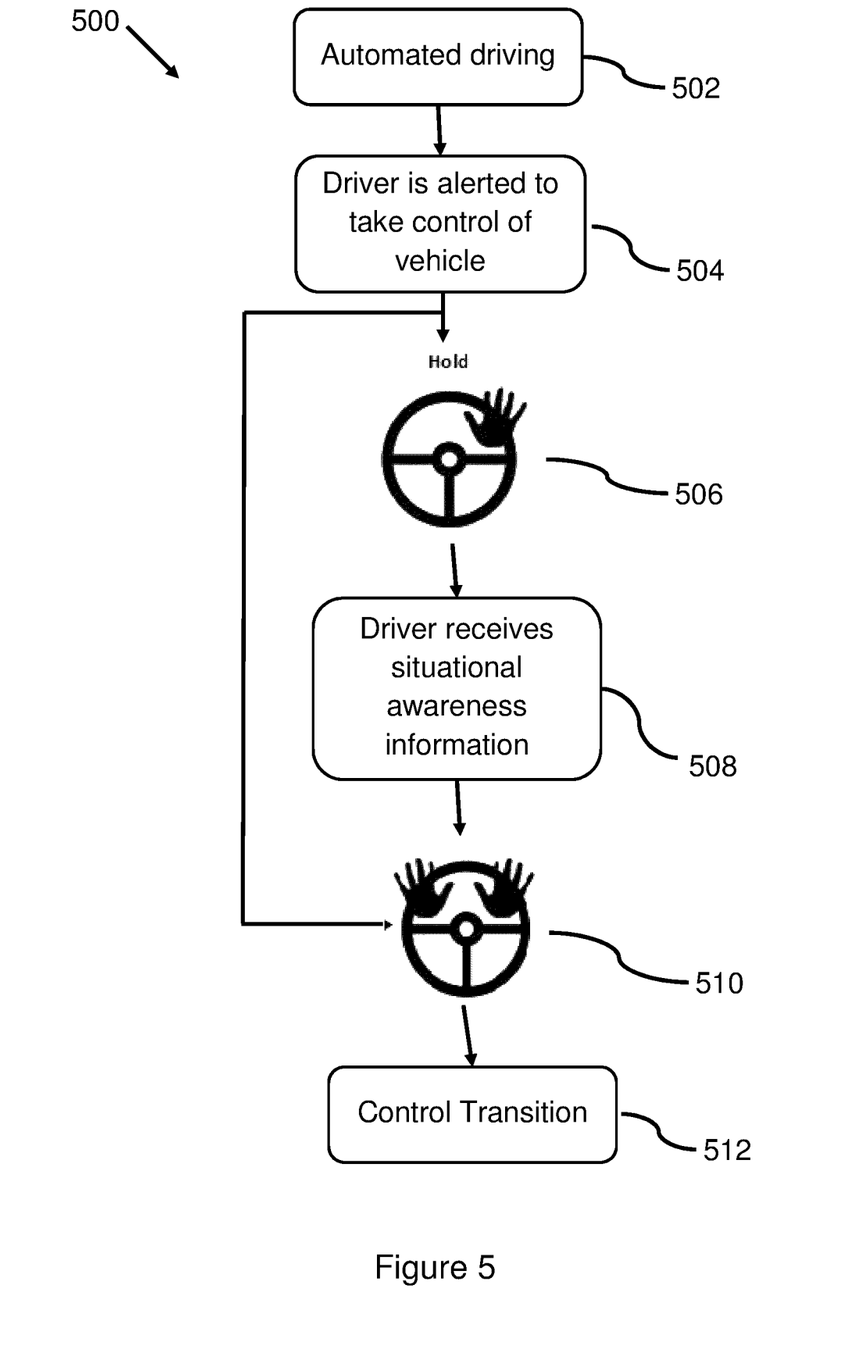
FIG. 5 shows a flow chart of a control method in accordance with an embodiment of the present invention.

Referring now to FIG. 5, there is shown a flow chart of a control method, indicated generally by the reference numeral 500, for controlling a transition of a vehicle between a first driving mode and a second driving mode. The method of FIG. 5 is based again on the presence of the user's hands on the steering wheel as the occupant-initiated requests that give rise to the first request signal and the second request signal. In the method 500, the vehicle is at first operating 502 in an autonomous driving mode. As a transition to manual driving mode, or lower level autonomous driving mode, approaches, the occupant is alerted 504 to the upcoming transition. The alert may comprise audio and/or visual aspects and may be customisable by the user. The driver places 506 one hand on the steering wheel. This is an occupant-initiated preparatory request which results in a first request signal, and then a first control signal. The first control signal results in the information on the driving environment being relayed 508 to the user. The user then places 510 a second hand on the steering wheel. This is the occupant-initiated transition request, which results in the second request signal and thus the second control signal. The transition from autonomous driving mode is made 512. While FIG. 5 shows that the occupant's right hand is placed on the steering wheel to generate the first request signal, it will be understood that either the left or right hand may be used to generate the first request signal.

Figure 6:
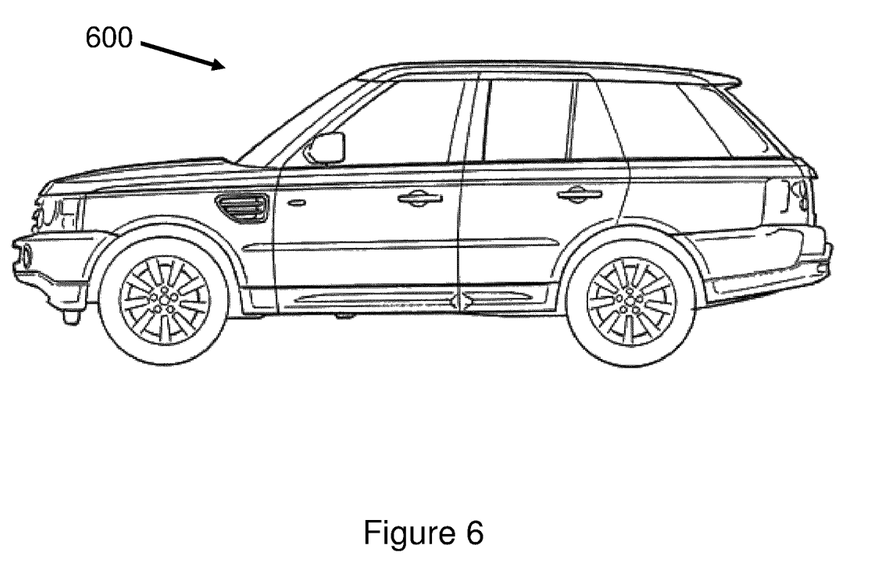
FIG. 6 shows a vehicle in accordance with an embodiment of the invention.

Referring now to FIG. 6, there is shown a vehicle in which the control system and methods described herein may be implemented.

The invention relates to ways of a user controlling transitioning of an autonomous vehicle between different driving modes, e.g. between two of a fully autonomous driving mode, a partially autonomous driving mode and a manual driving mode. The invention aims to assist the driver in resuming situational awareness before taking control of the vehicle. The invention uses a combination of request signals from the user to allow the user to obtain information about the state of the vehicle and driving environment before resuming full control of the vehicle. In one particular embodiment, the user places one hand on the steering wheel to cause information to be provided, then places a second hand on the steering wheel when ready to transition a manual driving mode.

It will be appreciated that various changes and modifications can be made to the present invention without departing from the scope of the present application.

The invention claimed is:

1. A control system for controlling a transition of a vehicle between a first driving mode and a second driving mode, the control system comprising one or more controllers, configured to:
   receive a first request signal indicative of an occupant-initiated preparatory request;
   receive a second request signal indicative of an occupant-initiated transition request;
   determine a first control signal for controlling output of information to an occupant of the vehicle indicative of the driving environment in dependence on receipt of the first request signal;
   determine a second control signal for causing transition of the vehicle between the first driving mode to the second driving mode in dependence on receipt of both the first request signal and the second request signal; and
   output the first or second control signal to a vehicle system.

2. The control system according to claim 1, wherein the first driving mode or second driving mode is an autonomous driving mode, wherein the first driving mode or second driving mode is a manual driving mode, or wherein the first driving mode or the second driving mode is a partially autonomous driving mode.

3. The control system according to claim 2, wherein the first request signal is indicative of a detected occupant-input comprising an occupant gaze of predefined characteristic.

4. The control system according to claim 2, wherein the first request signal is indicative of a detected occupant-input comprising the occupant placing one hand on a steering wheel of the vehicle.

5. The control system according to claim 2, wherein the first request signal is indicative of a detected occupant-input comprising a voice request from the occupant.

6. The control system according to claim 1, wherein the control system is configured to receive the first request signal from a sensor, the first request signal being indicative of at least one first occupant-input detected by the sensor.

7. The control system according to claim 6, wherein the first request signal is indicative of a plurality of occupant-inputs being detected by the sensor.

8. The control system according to claim 1, wherein the second request signal is indicative of a detected occupant-input comprising the occupant placing both hands on a steering wheel of the vehicle.

9. The control system according to claim 1, wherein the information indicative of the driving environment comprises at least one of potential hazards, time until handover, speed, upcoming manoeuvres, and future action required.

10. A vehicle system comprising the control system according to claim 1, the vehicle system having a sensor for detecting one or both of the occupant-initiated requests.

11. The vehicle system according to claim 10, wherein the sensor is attached or integral with a steering wheel.

12. The vehicle system according to claim 10, wherein the sensor comprises at least one of an imaging system for detecting the pose of the occupant's hands, an audio sensor for receiving voice signals from the occupant, and a gaze sensor for monitoring the gaze of the occupant.

13. A vehicle comprising the control system of claim 1.

14. A control method for controlling a transition of a vehicle between a first driving mode and a second driving mode, the control method comprising:
- receiving a first request signal indicative of occupant-initiated preparatory request;
- receiving a second request signal indicative of occupant-initiated transfer request;
- determining a first control signal for controlling output of information to an occupant of the vehicle indicative of the driving environment in dependence on receipt of the first request signal;
- determining a second control signal for causing transition of the vehicle from the first driving mode to the second driving mode in dependence on receipt of both the first request signal and the second request signal; and
- outputting the first or second control signal to a vehicle system.

15. A non-transitory, computer-readable storage medium storing instructions thereon that, when executed by one or more electronic processors, causes the one or more electronic processors to carry out the method according to claim 14.

* * * * *